APPARATUS FOR READING RECORD CARDS

Original Filed Jan. 31, 1969 10 Sheets-Sheet 1

Inventor:
Jacob Peter Pot
BY Baldwin Wight Diller & Brown
Attorneys

March 13, 1973 J. P. POT 3,720,809

APPARATUS FOR READING RECORD CARDS

Original Filed Jan. 31, 1969 10 Sheets-Sheet 2

March 13, 1973 J. P. POT 3,720,809

APPARATUS FOR READING RECORD CARDS

Original Filed Jan. 31, 1969 10 Sheets-Sheet 4

March 13, 1973 J. P. POT 3,720,809

APPARATUS FOR READING RECORD CARDS

Original Filed Jan. 31, 1969 10 Sheets-Sheet 6

March 13, 1973 J. P. POT 3,720,809

APPARATUS FOR READING RECORD CARDS

Original Filed Jan. 31, 1969 10 Sheets-Sheet 8

March 13, 1973 J. P. POT 3,720,809

APPARATUS FOR READING RECORD CARDS

Original Filed Jan. 31, 1969 10 Sheets-Sheet 10

United States Patent Office 3,720,809

Patented Mar. 13, 1973

3,720,809

APPARATUS FOR READING RECORD CARDS

Jacob Peter Pot, Amsterdam, Netherlands, assignor to Bull General Electric (Nederland) N.V., Amsterdam, Netherlands Continuation of application Ser. No. 796,320, Jan. 31, 1969. This application Oct. 16, 1970, Ser. No. 81,552

Claims priority, application Netherlands, Feb. 12, 1968, 6801931

Int. Cl. G06k *7/10;* H01h *43/08*

U.S. Cl. 235—61.11 E 21 Claims

ABSTRACT OF THE DISCLOSURE

An apparatus for reading punched cards co-operating with a control arrangement and provided with a synchronous motor having two directions of rotation adapted to drive rollers for advancing a card, either for the complete introduction of a card or for its ejection, with a step-by-step motor having two directions of rotation which is adapted to drive a conveyor band guiding an introduced card, the said band being supported by two rolls, one of which is retractable during the introduction and the ejection of a card. Logical circuits control the feeding of a number of actuating electromagnets of the sychronous motor and of the step-by-step motor, whereby a card is advanced columnwise in the forward direction and in the rearward direction as a result of pulses supplied by the control arrangement, which finally provides an ejection control pulse.

This is a continuation of application Ser. No. 796,320 filed Jan. 31, 1969 and now abandoned.

This invention relates to improvements in apparatus for reading records cards, which are designed to operate in combination with a control arrangement in a data-processing system.

In some data-processing systems in which punched cards are read column-by-column, it is unnecessary for the reading apparatus to have high performances. It may be sufficient for the reading apparatus to be able to read the perforations at a maximum rate of thirty columns per second, for example.

On the other hand, in contrast to many machines in which the cards from a stack are almost completely automatically processed, it may be preferable for the cards to be manually introduced one after the other into the reading apparatus. Finally, the data-processing system may require the reading apparatus to be capable of supplying to it, concurrently with the reading of each column of perforations, the number of the column read, these numbers extending from 1 to 80 in the case of the use of the well-known 80-column punched cards.

An object of the invention is to provide a record-card reading apparatus which satisfies the aforesaid requirements. In correlation with its particular use, this reading apparatus must obviously be of relatively simple construction, must not require complicated adjustments and must be immune from reading errors.

In a known card-reading apparatus, a transparent drum serves to carry a "detail" card and a "programme" card past two separate reading stations in order that the data read may be compared. Although it is within the ability of the person skilled in the art to replace the aforesaid programme card by a card provided with series of perforations corresponding to the numbers of the columns of the detail card, this known reading apparatus would not achieve the objects of the present invention, because the cylindrical form of its drum necessitates relatively complex and bulky conveying devices. In addition, in this apparatus, the detail card is always shifted in the same direction, whether this be in the course of its reading or in the course of its ejection from the apparatus.

Another object of the invention is to provide a reading apparatus which conforms to the aforesaid conditions and which is adapted to displace the card to be read in the direction of its length, first in one sense and then in the opposite sense, so as to permit repeated reading of one or more columns of perforations, according to the requirements. Correlatively, when the card is ejected from the apparatus it must be displaced in the direction opposite to the direction of the movement of introduction.

The basic idea of the invention is to provide in the reading appaartus two independent motor-operated conveying systems, the first of which effects the automatic positioning of a card in the pre-reading position, as also its final ejection, while the second effects the step-by-step displacement of the card in both directions during the reading operations.

In accordance with the invention, therefore, there is provided an apparatus for reading record cards which is connected to a control arrangement for reading cards comprising a number N of columns of marks or perforations, the said apparatus comprising, in addition to a support frame, a reading station arranged to supply card-column reading signals, a first group of card-feeding members composed of gripping rollers, which are coupled to a synchronous motor having two directions of rotation, a second group of card-feeding members composed of a conveyor band having a first portion adapted to receive and to position a card, and rolls supporting the band of which a first roll is fast with a step-by-step motor capable of drving the band by one column step in a "forward" direction or in a "rearward" direction, and of which the second idle roll is supported by a displaceable shutter, electromagnets with movable members for effecting the operative or inoperative positioning of at least one of the gripping rollers and of the shutter, column-indicating means coupled to the first portion of the band and adapted to supply signals indicating in code the number of the card column situated opposite the reading station; card-position detecting means adapted to supply logical signals indicating whether or not a card is situated, in relation to the reading station, in a so-called "column 0" position preceding the first column, and logical circuits coupled to the detecting means and to the column-indicating means for controlling the action of the synchronous motor and of the actuating electromagnets for bringing a card, manually introduced into the apparatus, into the "column 0" position, for stopping the synchronous motor and for authorising the actuation of the step-by-step motor.

The position-detecting means are in addition adapted to check that each card has in fact been correctly presented by the operator in its introduction into the apparatus.

For a better understanding of the invention and the manner in which it may be carried into effect, the same will now be more fully described, by way of example, with reference to the accompanying drawings, in which.

Figure 2:
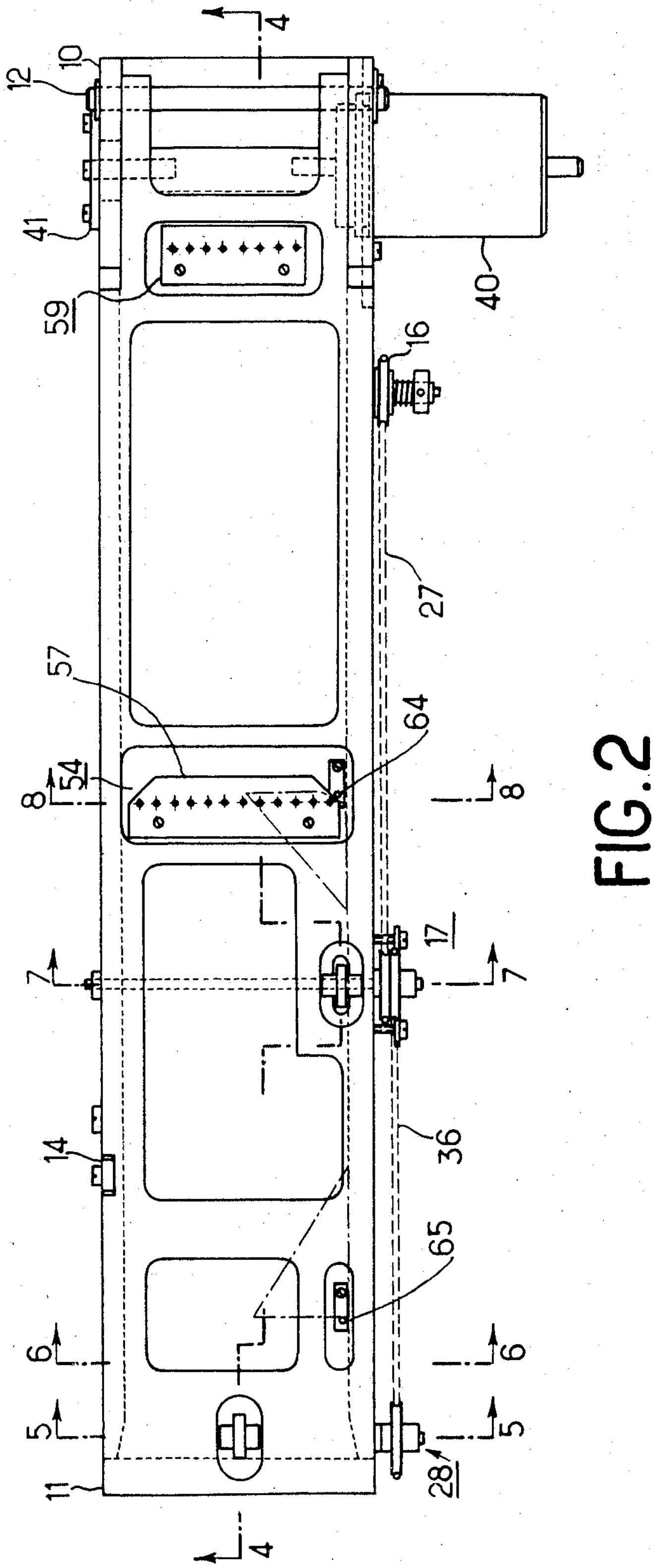
FIG. 2 is an overhead view of the apparatus.
Figure 3:
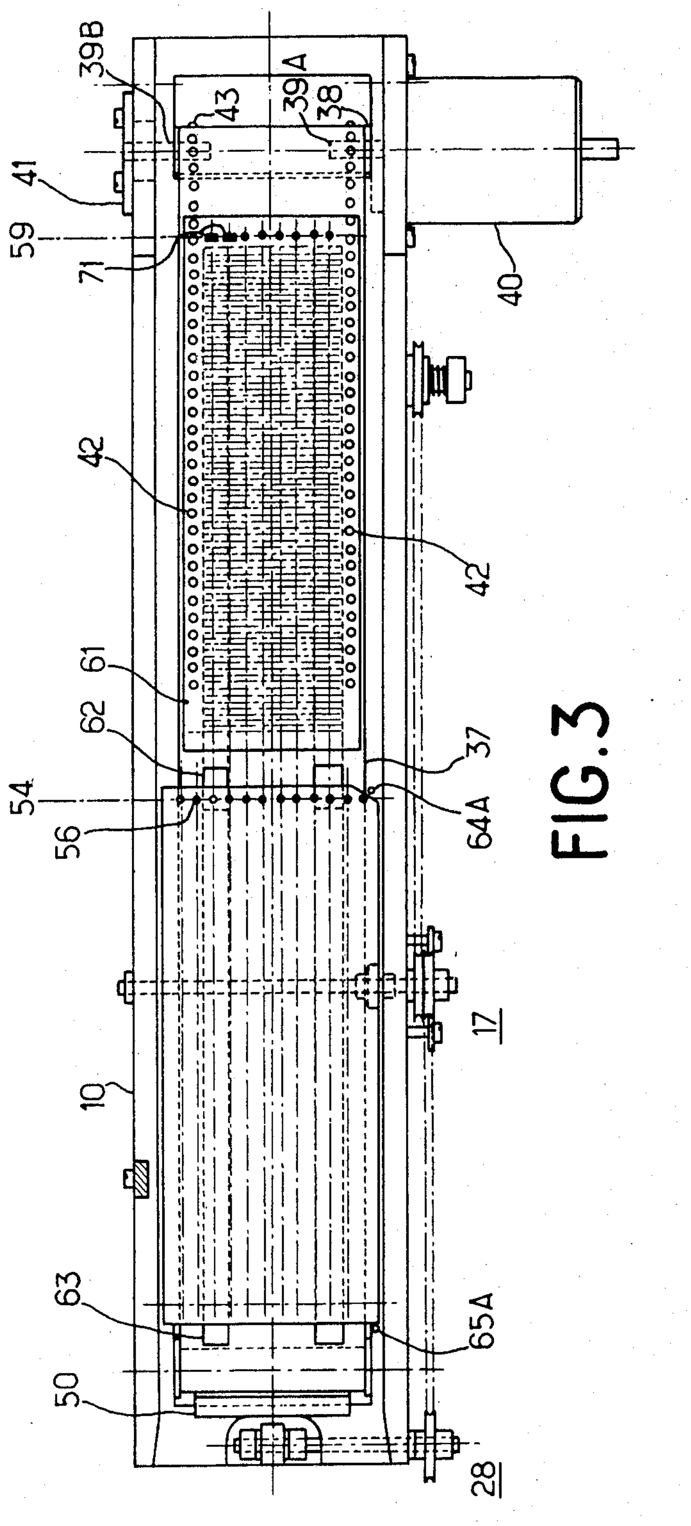
Figure 4A:
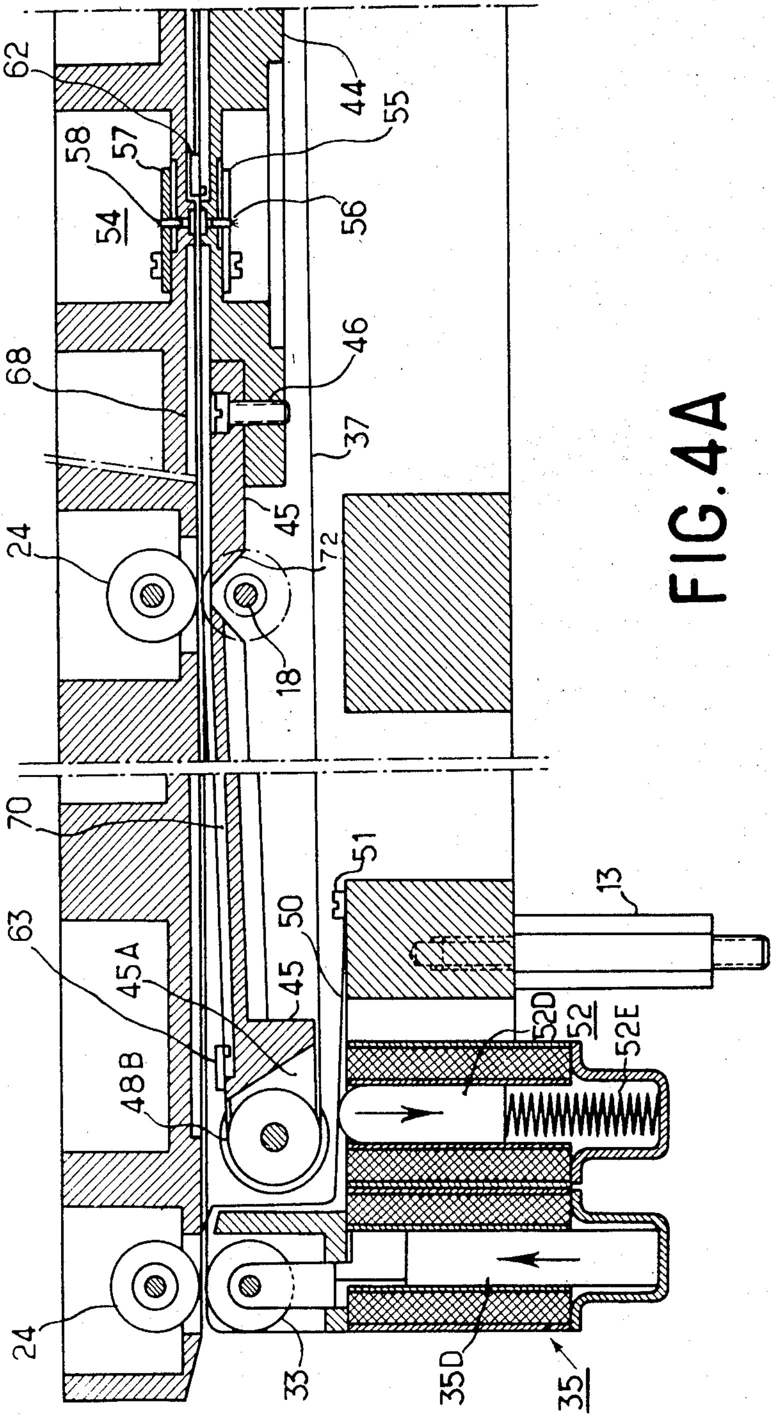
Figure 4B:
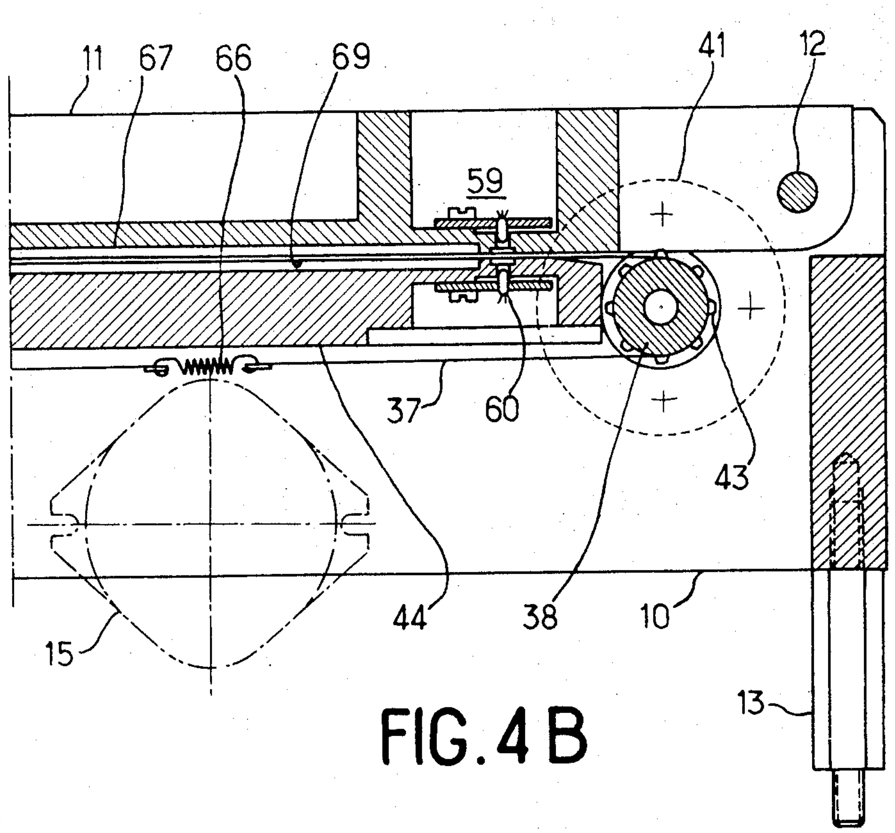
Figure 9:
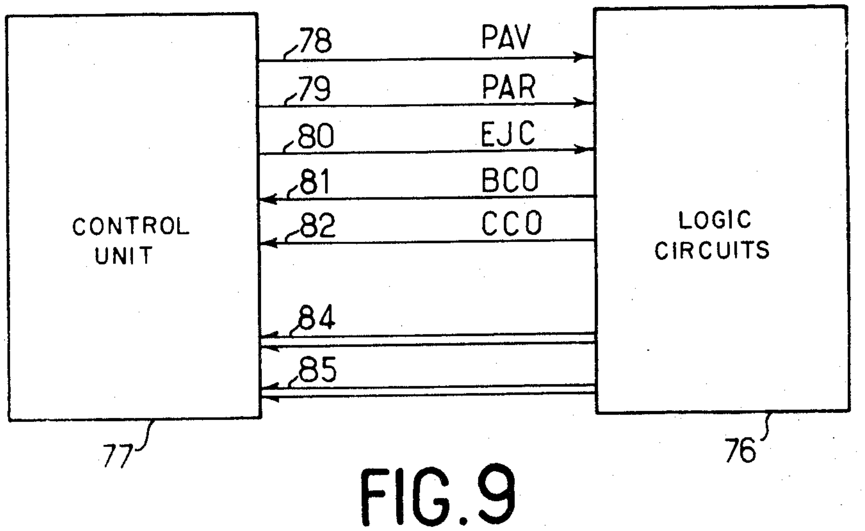
Figure 10A:
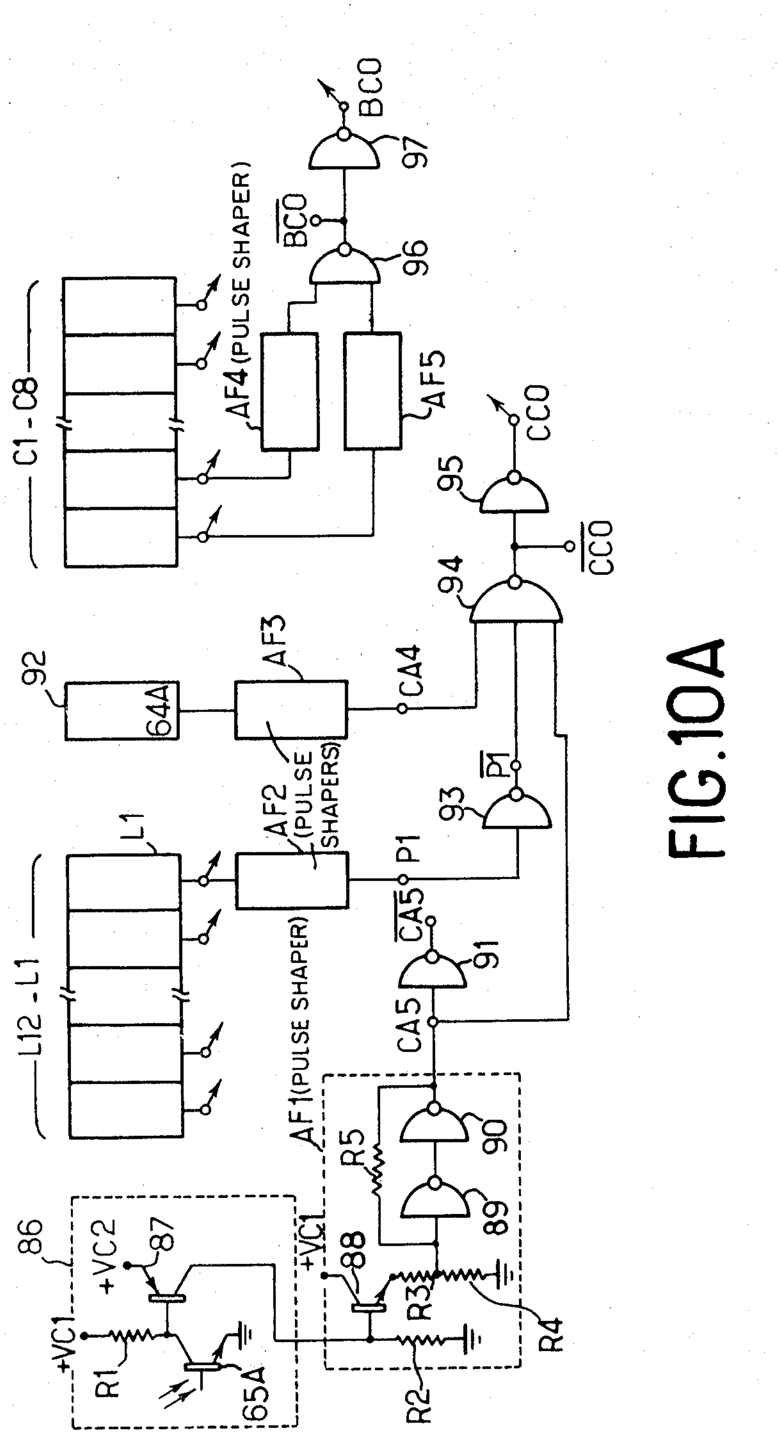
Figure 10B:
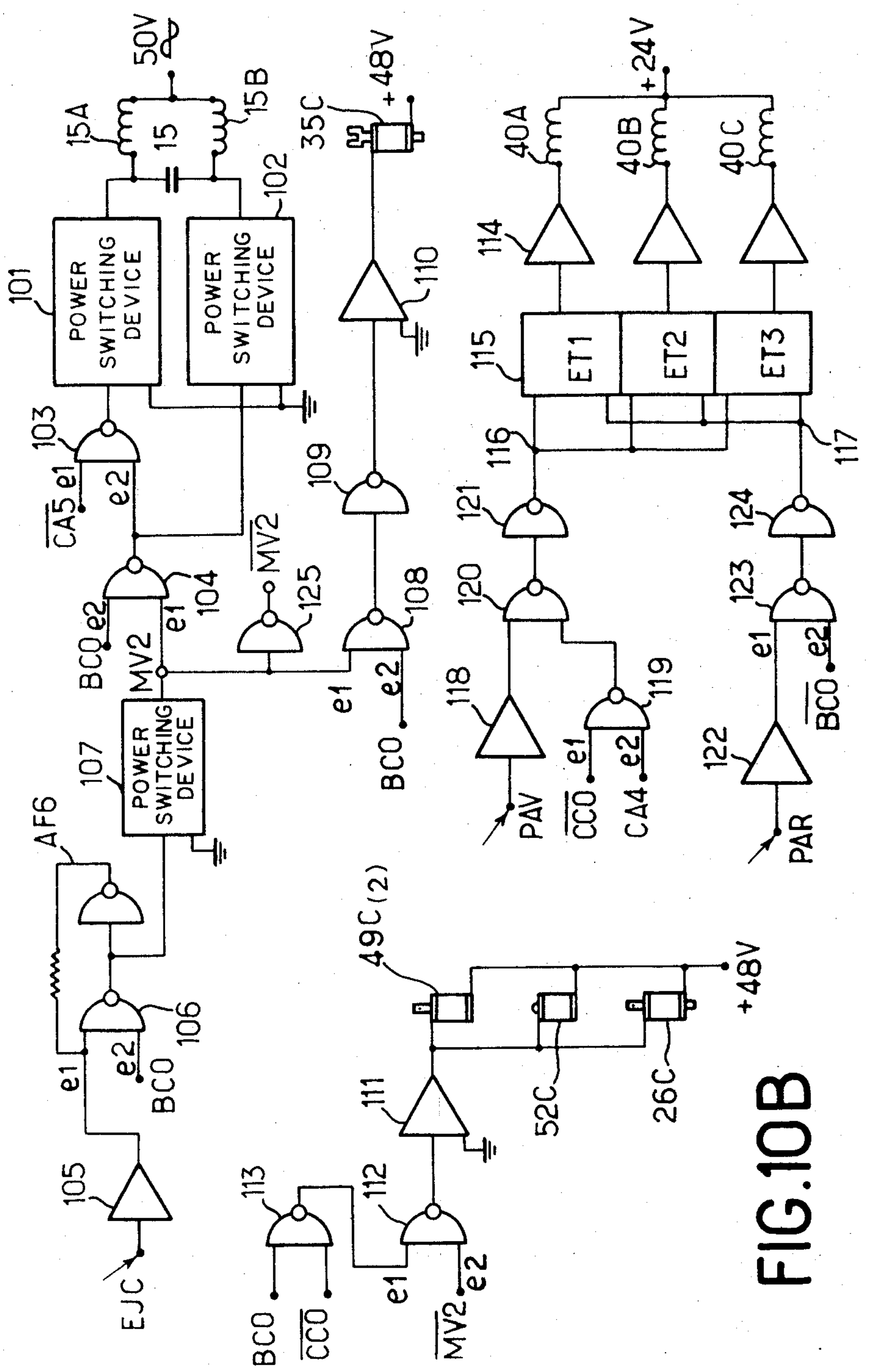
Figure 11:
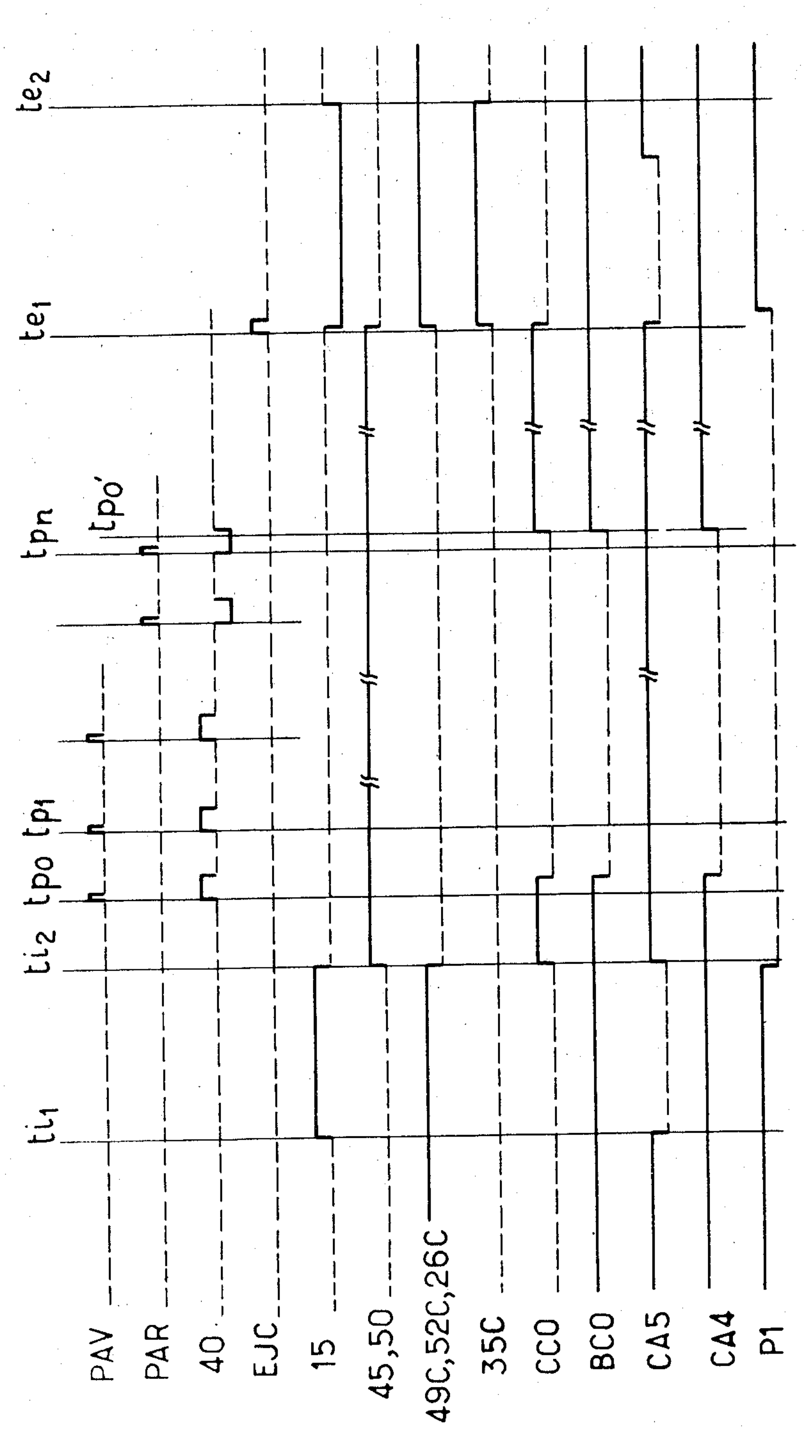

FIG. 3 is an overhead view of the apparatus, of which the cover is assumed to have been removed, FIGS. 4A and 4B show a longitudinal section through the apparatus, FIGS. 5, 6, 7 and 8 show transverse sections taken respectively along the lines 5—5, 6—6, 7—7 and 8—8 as indicated in FIG. 2, FIG. 9 is a simplified diagram of the connections between circuits incorporated in the reading apparatus and an associated control arrangement, FIGS. 10A and 10B illustrate the circuits incorporated in the reading apparatus, and FIG. 11 is a signal graph plotted as a function of time, which is useful in the explanation of the general operation of the apparatus.

The reading apparatus will be described starting from the mechanical members which effect the positioning, the conveyance and the ejection of a record card previously manually introduced into the apparatus. Although the description is based on the use of well-known punched cards having 80 columns of perforations, it is to be understood that any other type of record card could be employed, for example that provided with columns of marks analysable by any known method.

Figure 1:
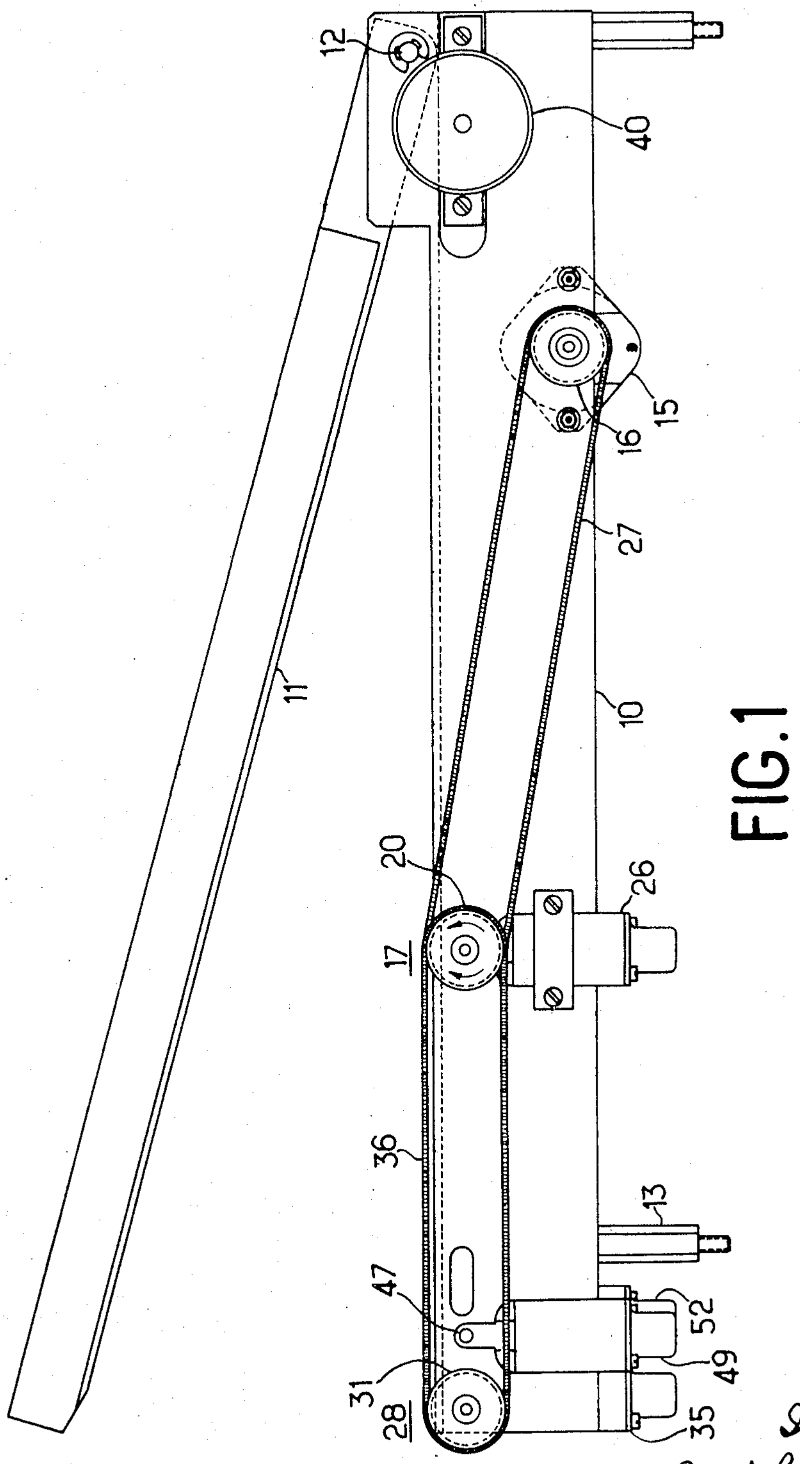
FIG. 1 is an elevational view of reading apparatus according to the invention.

Referring to FIGS. 1 and 2, the apparatus comprises essentially a main fram 10 of elongate form and a cover 11 hingedly mounted on two lugs of the frame by means of a pin 12. Four posts 13 are secured to the lower face of the frame and enable the latter to be assembled with a casing or chassis, which is not shown because it may differ in accordance with the manner in which the associated electronic elements are fitted and in accordance with the external appearance chosen for the apparatus.

The upper part of the frame 10 (see FIGS. 5 to 8) is so cut as to provide a card passage which is only slightly wider than a card in order that the latter may be guided in the course of its displacement in the direction of its length. Although the cover 11 is shown in the open position in FIG. 1, it is to be understood that it is normally in the closed position and is maintained therein more particularly by means of a latch 14 which is partly shown in FIG. 2. In this position, the card passage is scarcely thicker than the thickness of a card in order that the latter may not be deformed. The frame and the cover are formed with machined recesses or apertures to receive the various card-conveying members.

While the first part of the introduction of a card into the apparatus is manually effected by an operator, motor-actuated members are provided to complete this introduction automatically, i.e. in order to bring the card into the pre-reading position. These members, which also serve to perform the automatic ejection of a card after it has been read, may be seen in FIGS. 1 to 8.

The electric motor 15, which is of the synchronous type, is secured (FIG. 8) in a recess below the frame. A pulley 16 is fast with one end of the shaft of the motor.

A lateral advance device 17 (FIGS. 1, 2 and 7) comprises a spindle 18 which turns at one end in a bearing 19 secured to the rear face of the frame 10; the spindle supports at its other end a two-groove pulley 20 which is connected to the spindle 18 by a pin 21. The spindle 18 also supports a lower roller 22 connected thereto by a pin 23. Situated above this is an upper roller 24 turning freely on spindle 25 which is fixed in the cover 11.

An actuating electromagnet 26 is secured on the side of the front face of the frame and comprises a frame formed of two parts 26A, 26B, a coil 26C and a movable member 26D, of which at least the lower part consists of soft steel. The upper part of the movable member is formed with a hole serving as a second bearing for the spindle 18. When the coil of the electromagnet is energised, the movable member is urged to move upwards and if a punched card is situated in this position, a longitudinal edge portion of the card is gripped between the rollers 22 and 24. On the other hand, when the coil is not energised, the weights of the movable member 26D, of the pulley 20 and of the roller 22 are sufficient to maintain the roller 22 in spaced relationship to the roller 24, to such an extent that it cannot drive a card.

An endless belt 27 in the form of a coil spring is mounted in one of the grooves of the pulley 20 and on the pulley 16 of the synchronous motor 15. The latter can turn in two opposite directions, namely an "introduction" direction and an "ejection" direction.

A central advance device 28 (FIGS. 1, 2 and 5) is situated towards the entrance of the frame 10. It comprises a spindle 29 turning in the bearing 30, which is fixed on the side of the forward face of the frame. One end of the spindle 29 is connected to the pulley 31 by a pin 32. At the other end, a pulley 33 is fixed on the spindle by a screw 34. The device is completed by an electromagnet 35, which is of the same construction as the electromagnet 26 and which differs from the latter only in the shape of the upper part of the movable member 35D. The latter is in the form of a fork formed with holes serving as a second bearing for the spindle 29. The shape to be given to the upper part of the movable member 35D may be seen from FIG. 4A. Another upper roller 24 (FIGS. 4A and 5) turning freely on the spindle 25 is situated above the roller 33 on the axis of the cover.

Another belt 36 in the form of an endless coil spring is mounted on the one hand in a second groove in the pulley 20 (FIG. 7) and on the other hand on the pulley 31, in such manner that the latter may also be driven by the synchronous motor 15. However, the advance device 28 is operative only during the card ejecting movement, which is the only period when the electromagnet 35 is energised and urges the lower roller 33 upwards. Outside this period, the weight of the movable members is sufficient to move the lower roller away downwardly in order, for example, to enable a card to be introduced into the apparatus.

Another group of motor-actuated members is provided to perform a step-by-step advance movement, i.e. a column-by-column movement, of a punched card when the latter has been completely introduced into the apparatus.

This group of members comprises a band 37 (FIGS. 3, 4A and 4B) made of "Mylar" (registered trademark), which is a very thin and generally light-transparent polyester film. This band is stretched over two rolls, one of which is shown in section in FIG. 4B. This is the roll 38, which is positioned in a recess in the frame and which is secured to one end of the shaft 39A of the motor 40 so as to rotate therewith. The motor, which is secured on the side of the forward face of the frame, is a step-by-step motor, i.e. it is provided with a number of toothed magnetic rims and a number of windings and its shaft is adapted to turn from one to the other of a number of angular positions each time a different winding is supplied with a direct current.

The other end of the roll 38 is fast with the spindle 39B turning in the bearing 41, which is secured to the other lateral face of the frame 10.

The band 37 is formed with two rows of holes 42 close to its lateral edges, the pitch and spacing of the said holes corresponding to those of driving dogs 43, provided on the outside face of the roll 38. The diameter of the latter is so chosen that when the driving shaft turns by one step, the band 37 moves by 2.21 mm., i.e. through the spacing between two columns of perforations in the card.

It will be seen from the longitudinal section of the frame 10 (FIGS. 4A and 4B) that the latter comprises a horizontal wall 44. The latter, which commences at the right, close to the roll 38, does not extend as far as the other end of the frame and is terminated by a stepped portion to which the flexible shutter 45 is secured, notably by a number of screws such as 46. The left-hand portion of the said shutter is terminated by two lugs (FIGS. 4A and 6) serving to support a spindle 47 and a second roll 48 in three parts 48A, 48B and 48C.

It may be seen from FIG. 4A that the shutter 45 is formed with a downwardly opening V-shaped slot 72, not only to permit the passage of the spindle 18 and of the pulley 22, but also to ensure that it has relatively great flexibility. The said shutter may consist of an acetal resin such as "Delrin" (registered trademark), which is a light material resistant to bending. Owing to this arrangement, the notched portion is equivalent to a hinge, but it is of simpler and less costly construction.

The result of all this is that the left-hand end of the shutter 45, and therefore also the roll 48, can occupy two positions; a lower position (FIG. 4A) suitable for the introduction of a card into the apparatus, and an upper position (FIG. 6) suitable for the step-by-step advance of the card. The ends of the spindle 47 are coupled to two electromagnets 49, each of which is secured to one lateral face of the frame 10 and comprises, like the preceding ones, a frame in two parts, a coil and a movable member 49D. When the coil is not energised, a spring 49E urges the movable member 49D upwards, so that the upper portion of the latter enters its machined seating in the frame. The coils of the two electromagnets 49 must therefore be energised in order that the roll 48 may be maintained in the lower position.

Figures 5, 6:
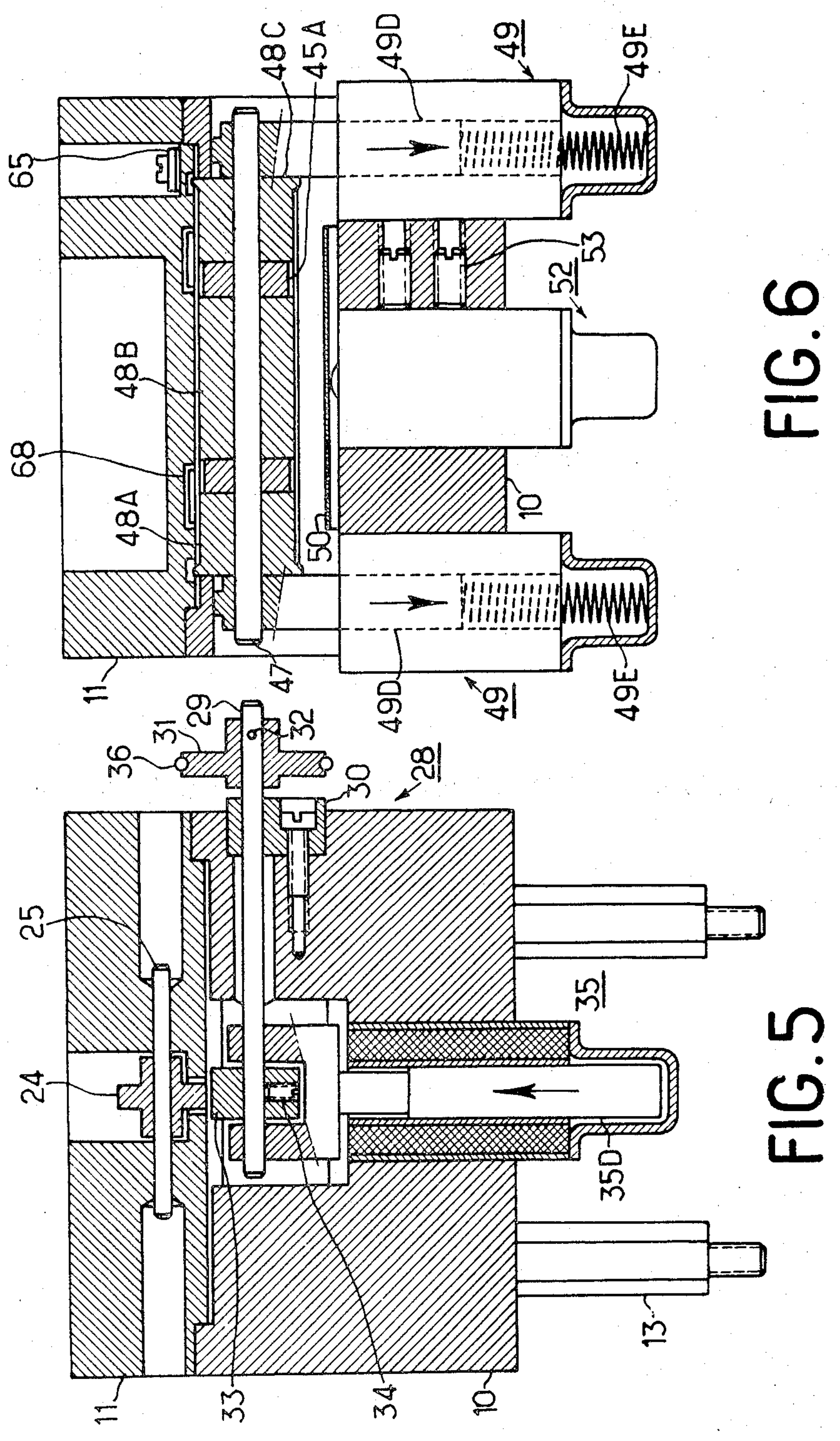

Reference will now be made to FIGS. 3, 4A and 6. In order to avoid incorrect operations, a device for preventing the introduction of cards is provided. This device comprises a controlled flap 50. The latter, the shape of which is shown in section in FIG. 4A; is made of a thin metal sheet, shaped to pass under the roll 48, and having an upper nose which, in the illustrated position, abuts the lower face of the cover 11 in order to prevent the introduction of a card into the apparatus. The said thin metal sheet may be secured by screws such as 51 to a transverse portion of the frame. The flap may be actuated by an electromagnet 52 similar to the preceding ones, which is secured in the frame by two screws 53 (FIG. 6). When the coil is not energised, the spring 52E, by pushing the movable member 52D, maintains the flap 50 in the illustrated position. Owing to the resilience of the flap, its nose moves downwards when the coil of the electromagnet 52 is energised, thus permitting the passage of a card.

Figure 8:
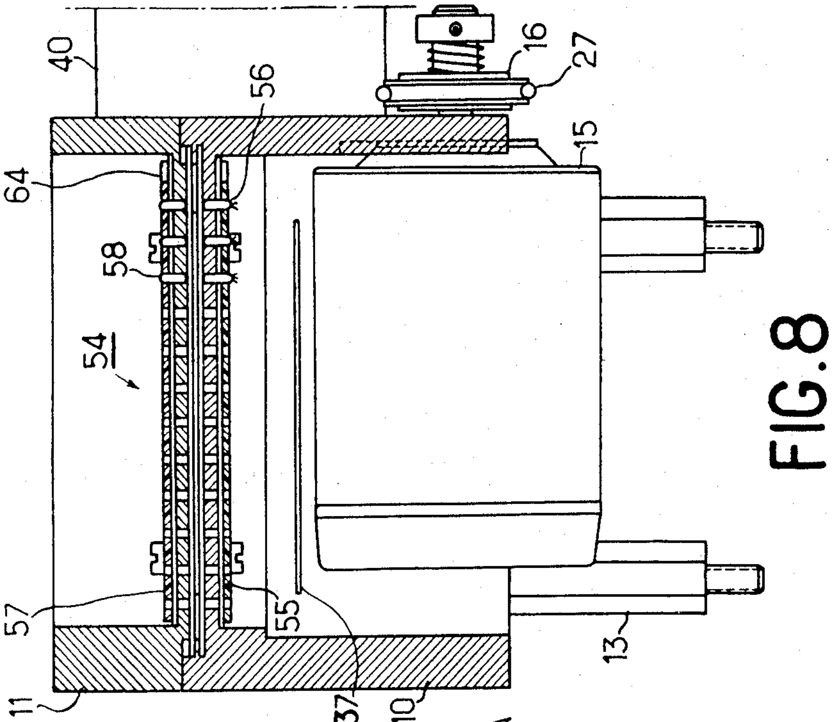

The section shown in FIG. 8 is taken through a reading station 54 disposed across the card passage in order to read a card column. This device comprises a lower plate 55 fixed in the frame below the card passage and adapted to support twelve photoelectric cells 56, the spacing of which corresponds to that of the lines of perforations in a punched card. Of course, the horizontal wall of the frame is formed with a corresponding number of holes. Above this are shown a plate 57 and twelve miniature incandescent lamps 58, the plate being secured in a recess in the cover 11. It is obvious that any other device capable of directing light rays on to the twelve photoelectric cells disposed below it could be employed at this point.

It may be seen in FIGS. 2 and 4B that another reading device 59 is disposed close to the roll 38. This device, which differs only by the fact that it comprises only eight photoelectric cells 60 (instead of twelve), co-operates with the conveyor band 37 to supply at any moment the number of the card column which is situated opposite the card-reading station 54.

To this end, the band 37 (FIG. 3) is provided with an opaque film 61 which may consist, for example, of a deposited metallic layer. This film must be sufficiently large to contain at least 81 series of perforations, the spacing of these series obviously being the same as that of the columns of a card. Provided in these series of perforations are seven lines, or perforation positions, to which are allocated binary values from 1 to 64, plus one position for a parity bit. It follows that each time a card column is situated opposite the reading station 54, some of the cells 60 are illuminated, their combination representing, in binary notation, for example, the number of the said column, i.e. from 1 to 80. The use of an 81st series of perforations will hereinafter be indicated.

It may be seen from FIGS. 3 and 4A that the upper run of the conveyor band 37 carries two "front" guides 62 and two "rear" guides 63, which are riveted thereto and serve to define the "correct position" of the card, as illustrated in these figures. This position is such that when a card has been completely introduced into the machine and the shutter 45 has been brought into its upper position, the column No. 1 is at a distance of one column pitch, i.e. 2.21 mm., to the left of the series of photoelectric cells 56 of the reading station 54. It may be stated, somewhat arbitrarily, that this card is in the "column 0" position.

Particular members are provided to check that, before the reading, an introduced card is in fact in the "column 0" position and that it is not inverted. There may be seen in FIGS. 2 and 3 two detecting devices 64 and 65, each of which is constructed as an element of the reading station, namely a photoelectric cell, secured by a support plate in the frame 10, and a miniature lamp secured by another support plate in the cover 11. The photoelectric cell 65A of the detector 65 is so positioned as to be immediately adjacent the rear edge of the card, and the cell 64A of the detector 64 is disposed beside the cut-off corner of the leading edge of the card. Consequently, when the card has been correctly presented and introduced, i.e. with the printed face uppermost and with the cut-off corner foremost, and is in the "column 0" position, the cells 65A and 64A are both illuminated. It is clear that the cell 64A will be masked if a card has been introduced upside down, i.e. with the printed face lowermost, or with the cut-off corner at the rear.

Figure 7:
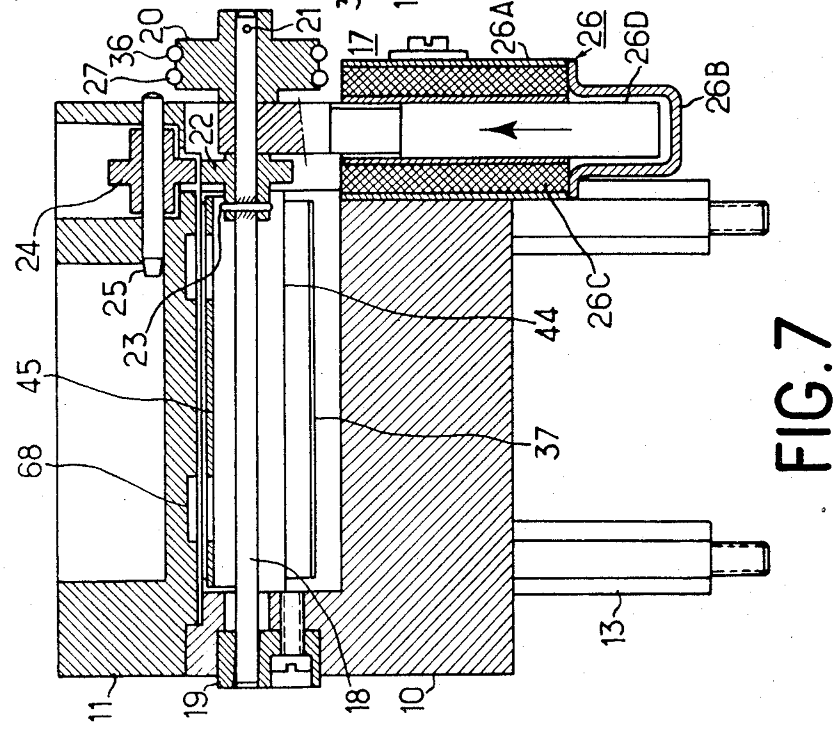

It is to be noted that the band 37 is appropriately tensioned at any instant, since its ends (FIG. 4B) are pulled by one or more springs 66. In addition, the width of the band 37 is smaller than the width of a punched card having 80 columns. If the width of the band is 66 mm., for example, one longitudinal edge of the card may be appropriately gripped between the rollers 22 and 24 of the advancing device 17 (FIG. 7). It will also be seen from this figure and from FIGS. 4A and 4B that grooves 67, 68, are machined in the cover 11 in order to provide a passage for the guides 62 and 63 respectively. Other grooves 69, 70 may be provided in the horizontal wall 44 of the frame 10 and in the shutter 45 in order to permit the passage of the riveted portions of the guides 62 and 63 in the course of the displacements of the band 37.

Finally, it is to be noted that the opaque film 61 on the band 37 (FIG. 3) comprises, in the 81st series of perforations, two perforations 71 situated above the cells of the reading device 59 which are allocated to the binary weights 64 and 32 respectively. These positions are simply chosen because these two binary weights are never simultaneously utilised in the encoded combinations indicating the column numbers from 1 to 80. These two perforations permit of checking that the conveyor band 37 has in fact been brought into the "column 0" position before a card is introduced into the apparatus and also before it is ejected therefrom.

There will now be described the assembly of electronic circuits incorporated in the reading apparatus, by means of which, in co-operation with a control arrangement, the following functions can be performed:

- automatic termination of the introduction of a card previously manually introduced into the apparatus in order to bring it into the pre-reading position, or "column 0" position,
- column-by-column reading of the card under the direction of the control arrangement, with possibility of rearward return for re-reading one or more columns, at a maximum rate of 30 columns per second,
- after return of the card into the "column 0" position, automatic ejection thereof, in the direction opposite to the introduction movement, under the direction of the associated control arrangement.

FIG. 9 shows in very diagrammatic manner that the combination of circuits 76, represented by a rectangle and incorporated in the card-reading apparatus, is connected by multiple links to a control arrangement 77, which is also symbolically represented by a rectangle. It is unnecessary to give a detailed description of this arrangement, but the signals which it is called upon to supply in order to control operation of the reading apparatus according to the invention will be specified.

Thus, the assembly 76 receives through two electrical links 78, 79 signals or pulses PAV, PAR respectively for effecting the movements either by one "forward step" or by one "rearward step." The assembly 76 may also receive through the link 80 a signal or pulse "EJC" for effecting a movement for the ejection of a card after it has been read. The assembly of circuits 76 supplies through the links 81, 82 to the control arrangement 77 the signals BCO and CCO which signify respectively "band in column 0 position" and "card in column 0 position." In addition, the links 84, which in fact comprise twelve transmission channels, permit of transmitting the perforation reading signals to the control arrangement, which utilises them in any appropriate known manner. Finally, the links 85, which in fact comprise eight transmission channels, permit of supplying to the control arrangement, in encoded form, the number of the card column, the reading of which is transmitted at the same time.

FIG. 10A shows in a diagrammatic form the circuits associated with the reading members and with the photo-electric detectors previously mentioned. Thus, there may be seen, within a rectangle 86, a pre-amplifier stage which includes a light-sensitive element 65A which corresponds to the photo-electric cell of the detector 65 previously mentioned. Any cell of sufficiently small dimensions may be suitable. It is shown here as a photo-diode or a photo-transistor. In this case, the collector electrode of the element 65A is directly connected to the base of a transistor 87 of PNP type, the emitter of which is conneced to a voltage source +VC2, and the base of which is connected by a resistor R1 to a voltage source +VC1.

The collector of the transistor 87 is directly connected to the input of a shaper-amplifier AF1, which comprises an input transistor 88 of NPN type, the base of which is connected to earth through a resistor R2, and the collector of which is connected to the voltage source +VC1. The emitter load of the said transistor is a voltage divider composed of the resistors R3 and R4. Connected to the junction point of these resistors is a feedback amplifier composed of two inverter-amplifier stages 89, 90 and in which a coupling between the output and the input is represented by a resistor R5. The well-known function of such a shaper-amplifier is to supply at its output a signal having steeper leading edges than the input signal. The operation of the stage 86 and of the shaper-amplifier AF1 is such that the signal CA5 appearing at the output is a voltage of +3 volts or a zero voltage, depending upon whether the cell is illuminated or masked.

There are shown at L12–L1 some of the 12-pre-amplifier stages associated with the reading station 54, these stages being identical to the pre-amplifier 86, and obviously including the 12 cells 56 already mentioned. An arrow attached to each of their output terminals serves to recall that the perforation-reading signals are transmitted to the control arrangement.

One of the cells of this reading station serves to detect the presence of a card in the "column 0" position. Any of these cells could be chosen. In the present case, there has been chosen the photo-electric cell disposed below the line of perforations of value 1. This is why a shaper-amplifier AF2, identical to AF1, is connected to the output of the pre-amplifier L1.

Another pre-amplifier stage 92 includes a photo-electric cell 64A associated with the detector 64 already mentioned. A shaper-amplifier AF3 is connected to the output of 92.

There are shown at C1–C8 some of the eight pre-amplifier stages associated with the reading device 59 already mentioned. These stages obviously include the eight cells 60 mentioned. Shaper-amplifiers AF5 and AF4 respectively are connected to the respective outputs of two of these stages, the cells of which are situated opposite perforations of binary weights 64 and 32 in the opaque film on the band 37.

The input of an inverter circuit 93 is connected to the output of the shaper-amplifier AF2 which supplies the signal P1. The inputs of a NAND circuit 94 are connected respectively to the outputs of the shaper-amplifier AF3, of the inverter circuit 93 and of the shaper-amplifier AF1. The input of an inverter circuit 95 is connected to the output of the NAND circuit 94. It is to be noted that the combination of a NAND circuit followed by an inverter is equivalent to a non-inverting AND circuit for positive signals in the present case.

During the time when a card is in the "column 0" position, the cells 65A and 64A are illuminated, while the cell of the reading station 54 allocated to the line 1 is masked. The output of 95 then supplies a positive voltage (signal CCO). The output of 94 supplies the signal $\overline{CCO}$, which is the complement or the inverse of the signal CCO.

The inputs of a NAND circuit 96 are connected respectively to the outputs of the shaper-amplifiers AF4 and AF5, and the input of an inverter 97 is connected to the output of 96. During the time when the conveyor band 37 is in a position such that it can guide a card into the "column 0" position, the output of 97 supplies a positive voltage (signal BCO). The output of 96 supplies the signal $\overline{BCO}$, which is the complement or the inverse of the signal BCO.

FIG. 10B shows the logical circuits, simplified to some extent, which are intended to monitor the feed of the motors and electromagnets previously mentioned.

The synchronous motor 15 comprises two windings 15A and 15B, one end of which is connected to an alternating-current source at an effective voltage of 50 volts, for example. The other end of these windings is connected to a terminal of a power switching device such as 101, 102, each of which may be composed in known manner of transistors, diodes and at least one thyristor.

The arrangement is such that when a unidirectional voltage of zero value is applied to the input of the device 101, the driving shaft turns in the "forward" or "introduction" direction. Likewise, if a unidirectional voltage of zero value is applied to the input of the device 102, the driving shaft turns in the "rearward" or "ejection" direction. The driving shaft does not turn when an appropriate positive voltage is applied to the inputs of the switches 101 and 102. The operation of these two devices depends upon the logical circuits 103 and 104.

An ejection control pulse EJC, emanating from the control arrangement 77, may be applied to the input of an amplifier 105 of the non-inverting type having slightly delayed response. The output of 105 is connected to an input *e1* of a shaper-amplifier AF6. The latter differs from the previously mentioned shaper-amplifiers only in that its first stage consists of a NAND circuit 106. The input *e2* of the latter is connected to the output of the inverter circuit 97 (FIG. 10A) in order to receive the signal BCO therefrom. In order to clarify the drawing, such connections are not shown. Owing to the indication of the signals received by the inputs of the logical circuits, it can readily be seen how these inputs are in fact connected.

The output of the stage 106 is connected to the input of a monostable circuit 107, the output of which is connected to the input *e1* of the NAND circuit 104. One input *e1* of the NAND circuit 103 receives the signal $\overline{CA5}$, while its other input *e2* is connected to the output of 104. The other input *e2* of this circuit 104 receives the signal BCO. The signal $\overline{MV2}$ is available at the output of the inverter 125.

The arrangement of these circuits is such that if the input of the amplifier 105 receives a positive pulse EJC from the control arrangement while the signal BCO is positive, the triggering input of the monostable circuit 107 receives a negative pulse which causes a signal MV2, which is a positive pulse of a duration of two seconds for example, to be set up at the output. It is clear that during this time the input of the switch 102 is subjected to a zero voltage which produces the rotation of the shaft of the motor 15 in the "ejection" direction. The conditions for the activation of the switch 101 will hereinafter be explained.

The energisation of the coil 35C of the electromagnet 35 depends upon the NAND circuit 108, upon the inverter circuit 109 and upon the non-inverting amplifier 110, the output of which can supply one end of the said winding, the other end of which is connected to a unidirectional-voltage source +48V. An input *e*1 of the NAND circuit 108 receives the signal MV2, while its second input *e*2 receives the signal BCO. It is clear that the winding 35C is energised during the presence of the signal MV2.

It will be seen on the left that the windings 49C (only one of the two is shown), 52C and 26C of the corresponding electromagnets can be fed from the voltage source +48V. They are connected in parallel to the power amplifier 111, of non-inverting type, the input of which is controlled by the output of the NAND circuit 112, the input *e*1 of which is connected to the NAND circuit 113. The inputs of the latter are connected to receive the signals BCO and $\overline{CCO}$ respectively, while the input *e*2 of 112 is connected to receive the signal $\overline{MV2}$.

In the step-by-step motor 40, the three windings 40A, 40B, 40C have one end connected to a unidirectional-voltage source +24V. The other end of each of these windings is connected to an amplifier such as 114. The element 115 is a closed-chain change-over switch composed of three stages ET1, ET2 and ET3. These stages consist of logical circuits and bistable circuits inter-connected in known manner so that the switch has two directions of progression. If positive pulses are applied to the "forward" input 116, the activated state of one stage will be transmitted to the next in the order ET1, ET2, ET3, ET1, etc. At each pulse received, a different winding of the step-by-step motor is supplied with direct current. Likewise, if positive pulses are applied to the "rearward" input 117, the activated state of a stage will be transmitted to the next in the inverse order ET3, ET2, ET1, ET3, etc.

The reception of a positive pulse by the input 116 depends upon the NAND circuits 119 and 120. The non-inverting amplifier 118, which includes differentiating members, is adapted to supply a positive pulse of an amplitude of 4 volts and of a duration of 0.1 microsecond, for example, when its input receives a positive pulse PAV (one forward step) from the control arrangement. The inputs of the logical circuit 119 are connected to receive the signals $\overline{CCO}$ and CA4. The inverter 121 is inserted between the logical circuit 120 and the input 116.

When the input of the amplifier 122 receives a positive pulse PAR (one rearward step) from the control arrangement, the application of a short positive pulse to the input 117 depends upon the NAND circuit 123, of which one input *e*2 is connected to receive the signal $\overline{BCO}$, The amplifier 122 is identical to the amplifier 118.

Referring mainly to FIGS. 10A, 10B and 11, the operation of the reading apparatus during the introduction of a punched card, the columnwise reading of the latter and its automatic ejection will be considered. It is to be noted that in the following a positive voltage level (for example +3 volts) will be equated with the logical "1" or positive signal, and a zero voltage level, or a voltage of approximately 0 volt, will be equated with the logical zero or negative signal.

Assuming that the conveyor band 37 has previously been brought into the "column 0" position and that there is no card in the apparatus, the situation is the following.

The signals BCO and $\overline{BCO}$ are at "1" and at "0" respectively. The cells 65A, 64A and that included in the pre-amplifier L1 are illuminated, and therefore $CCO=0$ and $\overline{CCO}=1$. In the absence of the signal MV2, the output of the inverter 109 supplies a zero voltage, the winding 35C is not energised and the roller 33 is in the lower position. The two inputs of the logical circuit 113 being positive, the windings 49C, 52C and 26C are energised, so that on the one hand the shutter 45 and the roll 48, as also the flap 50, are in the lower position, while on the other hand the roller 22 is in the upper position. The cell 65A being illuminated and the signal $\overline{CA5}$ being at "0," the synchronous motor 15 does not rotate.

It will now be assumed that a card is manually introduced into the apparatus by an operator and that consequently the forward edge of the card masks the cell 65A at the instant $ti_1$. At this instant, therefore, the signals CA5 and $\overline{CA5}$ change to "0" and to "1" respectively. The input *e*1 of 103 is subjected to a positive voltage and on the other hand the absence of the signal MV2 is sufficient to cause a positive voltage also to be set up at the input *e*2 of 103, which thus supplies a zero voltage to the input of the switch 101 in order to feed the winding 15A of the synchronous motor 15, the shaft of which starts to turn in the "introduction" direction. By means of the pulleys 16, 20, 31 and the belts 27 and 36, the rollers 22 and 33 are set in rotation in the same direction, but the roller 33 is inoperative.

When the card has been pushed far enough to come between the rollers 22 and 24, it is then driven at a predetermined constant speed until its introduction is complete. Shortly before the instant $ti_2$, the shorter forward side of the card masks the cells of the reading station 54 and notably that included in the pre-amplifier L1, and shortly after this the cell 65A is again illuminated. At the instant $ti_2$, the signals CCO and $\overline{CCO}$ change respectively to "1" and to "0" and the card must normally be stopped by the guides 62 on the band 37, in the "column 0" position.

Owing to the fact that the signal $\overline{CCO}$ has changed to "0," the windings 49C, 52C and 26C are no longer energised, so that: (1) the shutter 45 is brought into the upper position, in which the guides 63 are situated behind the rear edge of the card; (2) the flap 50 is raised and masks the card inlet; (3) the roller 22 is brought into the lower inoperative position. In addition, since the signal $\overline{CA5}$ has changed to "0," the switch 101 is opened and the synchronous motor 15 stops.

Owing to the transmission of the signal CCO, the control arrangement is notified that a card is in the correct "column 0" position and a variable time may elapse before it sends the first pulse PAV. Now, from the instant $ti_2$, the fact that the signal $\overline{CCO}$ has changed to "0," at the input *e*1 of 119, is sufficient to prepare the NAND circuit 120 to become conductive. Therefore, as soon as a pulse PAV is received by the input of the amplifier 118, for example at the instant $tp_0$, it will cause a one-step forward rotation of the shaft of the step-by-step motor 10, and the band 37 then moves the card, the first column of perforations of which is positioned opposite the reading station 54. Owing to the displacement of the band 37, the signals BCO and $\overline{BCO}$ change to "0" and to "1" respectively. Owing to the displacement of the card, the cell 64A is masked shortly after the instant $tp_0$. The signals CA4 and $\overline{CA4}$ change to "0" and "1" respectively. Consequently, the NAND circuit 94 (FIG. 10A) is rendered non-conductive and the signals CCO and $\overline{CCO}$ change to "0" and to "1" respectively.

From this instant, it is the signal CA4, at "0," received by the input *e*2 of 119 which is sufficient to render the logical circuit 120 conductive and therefore to ensure that the pulses PAV take effect. With regard to the effectiveness of the pulses PAR, the logical conditioning is simpler, as may be seen from FIG. 10B, because the signal $\overline{BCO}$, applied to the input *e*2 of the logiacl circuit 123, signifies that a pulse PAR can be effective if the band 37 is still in the "column 0" position or has returned thereto.

The control arrangement may send to the reading apparatus any sequence of pulses PAV and PAR suitable for the operation to be performed, either for the reading of the 80 columns of a card or for the reading of a smaller number of columns. Owing to the rearward return displacement, one or more columns may be re-read, the number of the column read being transmitted each time to the control arrangement.

Since the useful part of the conveyor band 37 is plane during the reading and the distance between the opaque film on the band and the card cannot vary, no error can occur in the column number transmitted to the control arrangement.

It will be assumed that the last pulse PAR is received at the instant $tp_n$. It is called the last because it is assumed that it has the effect of bringing the band and the card into the "column 0" position.

After the time necessary for the rearward displacement of the card, the cell 64A is again illuminated. At the instant $tp_{0'}$, the signal CA4 (FIG. 10A and 11) changes from "0" to "1," with the consequence that CCO=1 and $\overline{CCO}$=0, since the card has returned into the "column 0" position. A variable time may elapse before the control arrangement sends an ejection control pulse. During this time, the windings of all the electromagnets remain de-energised and none of the motors is operative.

If the pulse EJC is received at the instant $te_1$, then since the signal BCO as at "1" the required conditions are satisfied, as previously explained, for producing the generation of the signal MV2 by the monostable circuit 107. The winding 35C is consequently energised. On the other hand, since the signal $\overline{MV2}$ changes to "0" at the input *e*2 of 112, this is sufficient for a positive voltage to appear at the output of the latter and therefore to cause the energisation of the windings 49C, 52C and 26C. The delays inherent in the logical circuits and in the switches cause the shaft of the synchronous motor to start to turn in the "ejection" direction at the same time as the shutter 45 and the flap 50 return into the lower position and the rollers 22 and 33 are brought into the upper position. The card is therefore driven in the "ejection" direction. Since the preceding situation lasts for an appreciably longer time than is necessary for the complete ejection of the card, the latter is ejected and can fall into a card receptacle, which has not been shown, but which may be situated below the inlet of the reading apparatus.

When the signal MV2 ends, at the instant $te_2$, the winding of the electromagnet 35 is de-energised and the synchronous motor 15 stops. The roller 33 is brought into the lower position, and the reading apparatus is thereafter again ready to receive and to read a fresh card.

It is to be noted that it might be easy to add an incident-signalling device intended to warn the operator in the event of a card having been incorrectly introduced into the apparatus. This device could utilise the fact that in this case the signal CCO remains at "0" after the instant $ti_2$, i.e. after the end of the introduction of the card.

In addition, it may be observed that the photoelectric cell included in the pre-amplifier L1 performs its function of a means for detecting the presence of a card only while the signal CCO is at "1," i.e. only when the card is in the "column 0" position. Apart from this, the said cell can normally read the perforations "1" in the card.

Similarly, the fact that, of the cells 60 of the reading device 59, the two cells situated opposite the two additional perforations 71 (FIG. 3) have been used to generate the signal BCO does not in any way affect their normal operation.

Although the essential features of the invention have been described in the foregoing and illustrated in the drawings, it is obvious that the person skilled in the art may make therein certain modifications of form and of detail which are considered necessary, without departing from the scope of the invention.

I claim:

1. In record-card reading apparatus, connected to a control arrangement, for reading cards comprising a number N of columns of perforations or marks, comprising:
- a support frame,
- a reading station arranged to supply card-column reading signals,
- a first group of card-advancing members composed of gripping rollers, which are coupled to a first electric motor having two directions of rotation,
- a second group of card-advancing members composed of a conveyor band having a first portion adapted to receive and position a card and rolls supporting the said band, in which a first roll is associated with a step-by-step motor capable of driving the said band by one column spacing in a "forward" direction or in a "rearward" direction, and a second idle roll is supported by a displaceable shutter,
- electromagnets having movable members to bring at least one of the said gripping rollers and the said shutter either into the operative position or into the inoperative position,
- column-indicating means coupled to the first portion of the said band and adapted to supply encoded signals indicating the number of the card column situated opposite the said reading station,
- means for detecting the position of a card, adapted to supply logical signals indicating whether or not a card is situated, in relation to the said reading station, in a position called the "column 0" position which precedes the first card column, and
- logical circuits coupled to the said detecting means and to the said column-indicating means to control the actuation of the said first motor and of the said electromagnets in order to bring a card, after it has been manually introduced into the apparatus, into the "column 0" position to stop the said first motor and to permit the actuation of the said step-by-step motor.

2. A reading apparatus according to claim 1, wherein the said first group of advancing members comprises a lateral driving device including a first idle roller and a second roller fast with a spindle and with a pulley coupled to be set in rotation by the said first motor, and in which a first one of the said electromagnets possesses a movable member which can actuate the said spindle in order that the said second roller may grip a longitudinal edge of a card during the introduction and ejection of a card.

3. A reading apparatus according to claim 2, wherein the said first group of advancing members comprises in addition a central driving device including another idle roller and a third roller fast with a spindle and with a pulley coupled to be set in rotation by the said first motor, and in which a second one of the said electromagnets possesses a movable member which can actuate the said spindle in order that the said third roller may grip a card in order to effect the ejection of a card from the reading apparatus.

4. A reading apparatus according to claim 3, wherein an inlet end of the said displaceable shutter supports the said second roll and a spindle, which is coupled to the movable members of one pair of electromagnets of those mentioned in claim 1, in such manner that the said second roll may be brought either into a lower position permitting the introduction and ejection of a card or into an upper position which permits only the step-by-step displacement of a card during the reading of the latter.

5. A reading apparatus according to claim 4, wherein the said column-indicating means comprise a second portion of the said conveyor band which portion comprises an opaque film formed with a number N of series of perforations, each series of perforations representing in code the column number of a corresponding column of perforations in the punched card, and a reading device with a plurality of photo-electric cells, co-operating with the said second portion of the band and being so arranged that each time a series of perforations in the said band is opposite it a corresponding column of perforations in the said card is situated opposite the said first-mentioned reading station.

6. A reading apparatus according to claim 5, wherein the said opaque film on the said band is formed with two additional perforations which are so situated as to be opposite two of the photo-electric cells of the said reading device when a card is positioned on the said band, so that its first column is at a distance of one column behind the said reading station, and in which a first logical circuit is connected to the said two cells in order to generate complementary signals, one of which signifies "band in column 0 position" and the other "band not in column 0 position."

7. A reading apparatus according to claim 6, wherein the said detecting means comprise a number of photo-electric cells arranged to monitor the position of an introduced card, a first cell and a second cell straddling respectively the rear edge and the forward edge of the card when the latter has been normally introduced, and a third cell, which may be included in the said reading station, arranged to detect the presence of a card, a second logical circuit being connected to these three cells in order to generate complementary signals, one of which signifies "card in column 0 position" and the other "card not in column 0 position."

8. A reading apparatus according to claim 7, wherein a third logical circuit connected through an inverter circuit to the said first cell controls the feeding of a first winding of the said first motor, in such manner that the said winding is fed in order to effect the final introduction of a card until the latter is brought into the "column 0" position by the said band.

9. A reading apparatus according to claim 8, wherein a fourth logical circuit, which receives the said signals signifying "band in column 0 position" and "card not in column 0 position," controls the feeding of the said first electromagnet and of the said pair of electromagnets so that these electromagnets are de-energised immediately a card arrives in the "column 0" position, in order to bring the said first roller into the inoperative position and to bring the said second roll into the upper position.

10. A reading apparatus according to claim 9, wherein there is provided a closed-chain change-over switch for the sequential feeding of a number of windings of the said step-by-step motor, the said change-over switch comprising a number of stages with a first input controlled by a fifth logical circuit for the "forward" progression and a second input controlled by a sxith logical circuit for the "rearward" progression.

11. A reading apparatus according to claim 10, adapted to receive from the said control arrangement through two separate channels a series of "forward-step" pulses and a series of "rearward-step" pulses, and in which the said series of "forward-step" pulses is applied to an input of a first AND circuit, of which a second input is dependent upon another logical circuit, which is so connected that a forward step is authorised either when the said "card in column 0 position" signal is at the logical "1" or when the said second cell is masked by a card which has been advanced by at least one column spacing.

12. A reading apparatus according to claim 11, wherein the said series of "rearward-step" pulses is applied to an input of a second AND circuit, of which a second input receives the said "band not in column 0 position" signal, so that a rearward step is authorised as long as a card which has been read has not been returned into the "column 0" position.

13. A reading apparatus according to claim 10, adapted to receive from the said control arrangement an ejection control signal and in which a pulse generator, when it is triggered by an "ejection" pulse, generates a pulse of predetermined fixed duration, other logical circuits being so connected that, if the said conveyor band has in fact returned into the "column 0 position," the latter pulse is transmitted to a second winding of the said first motor in order to perform the ejection, in a direction opposite to the direction in which the card just read is introduced.

14. A record-card reading apparatus connected to a control arrangement to read cards having a number of columns of perforations or marks, comprising:

a support frame, a reading station arranged to supply card-column reading signals, a first group of card-advancing members composed of gripping rollers, which are coupled to a first electric motor having two directions of rotation, a second group of card-advancing members composed of a conveyor band having a first portion adapted to receive and position a card and rolls supporting the said band, in which a first roll is associated with a step-by-step motor capable of driving the said band by one column space in a "forward" direction and in a "rearward" direction and a second idle roll is supported by a displaceable shutter, electromagnets having movable members arranged to bring at least one of the said gripping rollers and the said shutter either into the operative position or into the inoperative position, means for detecting the position of a card, which are adapted to supply logical signals indicating whether or not a card is situated, in relation to the said reading station, in a so-called "column 0" position preceding the first card column, and logical circuits coupled to the said detecting means for controlling the action of the said first motor and of the said electromagnets in order to bring a card, after its manual introduction into the apparatus, into the "column 0" position, to stop the said first motor to permit the actuation of the said step-by-step motor.

15. A reading apparatus according to claim 14, wherein the said first group of advancing members comprises a lateral driving device including a first idle roller and a second roller fast with a spindle and with a pulley coupled to be set in rotation by the said first motor, and in which a first one of the said electro-magnets possesses a movable member which can actuate the said spindle in order that the said second roller may grip a longitudinal edge of a card during the introduction and ejection of a card.

16. A reading apparatus according to claim 15, wherein an inlet end of the said displaceable shutter supports the said second roll and a spindle, which is coupled to the movable members of one pair of electro-magnets of those mentioned in claim 1, in such manner that the said second roll may be brought either into a lower position permitting the introduction and ejection of a card or into an upper position which permits only the step-by-step displacement of a card during the reading of the latter.

17. A reading apparatus according to claim 16, wherein a second portion of the said band is provided with an opaque film formed with two perforations which are so positioned as to be opposite two photo-electric cells of an additional reading device when a card is disposed on the said band in such manner that its first column is at a distance of one column behind the said reading station, and in which a first logical circuit is connected to the said two cells in order to generate complementary signals, one of which signifies "band in column 0 position" and the other "band not in column 0 position."

18. A reading apparatus according to claim 17 wherein the said detecting means comprise a number of photo-electric cells arranged to monitor the position of an introduced card, a first cell and a second cell straddling respectively the rear edge and the forward edge of the card when the latter has been normally introduced, and a third cell, which may be included in the said reading station, arranged to detect the presence of a card, a second logical circuit being connected to these three cells in order to generate complementary signals, one of which signifies "card in column 0 position" and the other "card not in column 0 position."

19. A reading apparatus according to claim 18, wherein a third logical circuit connected through an inverter circuit to the said first cell controls the feeding of a first winding of the said first motor, in such manner that the said winding is fed in order to effect the final introduction of a card until the latter is brought into the "column 0" position by the said band.

20. A reading apparatus according to claim 19, wherein a fourth logical circuit, which receives the said signals signifying "band in column 0 position" and "card not in column 0 position," controls the feeding of the said first electromagnet and of the said pair of electromagnets, so that these electromagnets are de-energised immediately a card arrives in the "column 0" position, in order to bring the said first roller into the inoperative position and to bring the said second roll into the upper position.

21. A reading apparatus according to claim 20, wherein there is provided a closed-chain change-over switch for the sequential feeding of a number of windings of the said step-by-step motor, the said change-over switch comprising a number of stages with a first input controlled by a fifth logical circuit for the 'forward" progression and a second input controlled by a sixth logical circuit for the "rearward" progression.

References Cited

UNITED STATES PATENTS

| | | | |
|---|---|---|---|
| 3,521,033 | 7/1970 | May | 235—61.11 C |
| 3,303,328 | 2/1967 | Wenz | 235—61.11 R |
| 3,027,068 | 3/1962 | Iwai et al. | 234—126 |
| 3,480,762 | 11/1969 | Del Vecchio | 235—61.11 E |
| 3,229,073 | 1/1966 | Macker et al. | 235—61.11 E |
| 3,027,072 | 3/1962 | Levin et al. | 235—61.11 C |
| 3,178,175 | 4/1965 | Hohmann | 235—61.11 B |
| 3,386,018 | 5/1968 | Smith-Vaniz | 318—138 A |
| 3,555,247 | 1/1971 | Gruczelak | 235—61.11 E |

MAYNARD R. WILBUR, Primary Examiner

T. J. SLOYAN, Assistant Examiner

U.S. Cl. X.R.

200—46; 250—219 D, 219 DC